US006699570B2

United States Patent
Chopra et al.

(10) Patent No.: US 6,699,570 B2
(45) Date of Patent: Mar. 2, 2004

(54) COLORED CYBER TONER USING MULTICOLORED GYRICON SPHERES

(75) Inventors: Naveen Chopra, Oakville (CA); Steven Georges, Guelph (CA); Peter M. Kazmaier, Mississauga (CA); Sammy Y.H. Ro, Mississauga (CA); Man C. Tam, Mississauga (CA); Francisco E. Torres, San Jose, CA (US); Sophie V. Vandebroek, Penfield, NY (US)

(73) Assignee: Xerox Corporation, Stamford, CT (US)

(*) Notice: Subject to any disclaimer, the term of this patent is extended or adjusted under 35 U.S.C. 154(b) by 78 days.

(21) Appl. No.: 09/985,825

(22) Filed: Nov. 6, 2001

(65) Prior Publication Data

US 2003/0087068 A1 May 8, 2003

(51) Int. Cl.[7] .................................................. B32B 3/00
(52) U.S. Cl. ....................... 428/199; 428/323; 428/402; 428/365; 430/108.1
(58) Field of Search ................................ 428/199, 323, 428/402, 402.2, 403, 406, 365; 430/108.2, 108.1, 120, 137.14

(56) References Cited

U.S. PATENT DOCUMENTS

| | | |
|---|---|---|
| 2,326,634 A | 8/1943 | Gebhard et al. |
| 2,354,018 A | 7/1944 | Heltzer et al. |
| 2,354,048 A | 7/1944 | Palmquist |
| 2,354,049 A | 7/1944 | Palmquist et al. |

(List continued on next page.)

FOREIGN PATENT DOCUMENTS

| | | |
|---|---|---|
| DE | 40 08 825 A1 | 3/1991 |
| JP | 53-57998 | 5/1978 |

OTHER PUBLICATIONS

Lawrence L. Lee, "A Magnetic–Particles Display", *IEEE Transactions on Electron Devices*, vol. ED 22, No. 9, Sep. 1975, pp. 758–765.

Richard A. Strain, "Additive Color Mixture with Flourescent Pigments and Special Illumination", *Color Research and Application*, vol. 1, No. 3, Fall 1976, pp. 146–147.

M. Saitoh, T. Mori, R. Ishikawa and H. Tamura, "A Newly Developed Electrical Twisting Ball Display", *Proceeding of the SID*, vol. 23, No. 4, 1982, pp. 249–253.

R. Micheletto, H. Fukada and M. Ohtsu, "A Simple Method for the Production of a Two–Dimensional, Ordered Array of Small Latex Particles", *Langmuir*, vol. 11, No. 9, May 1995, pp. 3333–3336.

Deane B. Judd and Gunter Wyszecki, *Color in Business, Science and Industry* (2nd Ed.), New York: John Wiley and Sons, Inc., 1967, pp. 387–405.

(List continued on next page.)

*Primary Examiner*—Merrick Dixon
(74) *Attorney, Agent, or Firm*—Oliff & Berridge, PLC (57) ABSTRACT

A dynamic reimageable document or electric paper can be formed from ordinary substrates such as paper, transparencies or fabric by printing of microencapsulated Gyricon beads onto one or more discrete surface areas of the substrate. The substrate can include both fixed print regions formed by conventional fixed ink processes and dynamic reimageable regions formed by the Gyricon beads. The Gyricon beads are preferably bichromal and of contrasting colors, such as black/white so as to be changeable to display two states by selective application of electromagnetic force to the beads. By providing bichromal beads in differing color combinations, such as red/white and black/white, a multicolored document can be achieved in which various fields of the document, representing text, images or graphics, may be in differing colors. Moreover, operations to perform both imaging or erasure can act on the discrete reimageable regions so that the versatility of the electric paper can be enhanced. The Gyricon beads may be dispersed in a solution to form a liquid Gyricon toner that can be directly marked, such as by a jet nozzle, into a desired pattern on the substrate.

26 Claims, 8 Drawing Sheets

U.S. PATENT DOCUMENTS

| | | |
|---|---|---|
| 2,407,680 A | 9/1946 | Palmquist |
| 2,600,963 A | 6/1952 | Bland |
| 2,684,788 A | 7/1954 | Bland |
| 2,794,301 A | 6/1957 | Law et al. |
| 2,950,985 A | 8/1960 | Duval d'Adrian |
| 2,965,921 A | 12/1960 | Bland |
| 2,980,547 A | 4/1961 | Duval D'Adrian |
| 3,150,947 A | 9/1964 | Bland |
| 3,222,204 A | 12/1965 | Weber et al. |
| 3,243,273 A | 3/1966 | Bland |
| 3,310,391 A | 3/1967 | Law |
| 3,617,333 A | 11/1971 | Brown |
| 3,648,281 A | 3/1972 | Dahms et al. |
| 3,795,435 A | 3/1974 | Schwab |
| 3,915,771 A | 10/1975 | Gatzke et al. |
| 4,002,022 A | 1/1977 | Lopez C. |
| 4,082,426 A | 4/1978 | Brown |
| RE29,742 E | 8/1978 | Tung |
| 4,117,192 A | 9/1978 | Jorgensen |
| 4,117,194 A | 9/1978 | Barbe et al. |
| 4,126,854 A | 11/1978 | Sheridon |
| 4,143,103 A | 3/1979 | Sheridon |
| 4,229,732 A | 10/1980 | Hartstein et al. |
| 4,261,653 A | 4/1981 | Goodrich |
| 4,267,946 A | 5/1981 | Thatcher |
| 4,268,413 A | 5/1981 | Dabisch |
| 4,288,788 A | 9/1981 | Rogers et al. |
| 4,299,880 A | 11/1981 | Arens |
| 4,367,920 A | 1/1983 | Tung et al. |
| 4,374,889 A | 2/1983 | Arens |
| 4,381,616 A | 5/1983 | Saxer |
| 4,418,098 A | 11/1983 | Maistrovich |
| 4,438,160 A | 3/1984 | Ishikawa et al. |
| 4,441,791 A | 4/1984 | Hornbeck |
| 4,492,435 A | 1/1985 | Banton et al. |
| 4,500,172 A | 2/1985 | Gagnon et al. |
| 4,511,210 A | 4/1985 | Tung et al. |
| 4,569,857 A | 2/1986 | Tung et al. |
| 4,592,628 A | 6/1986 | Altman et al. |
| 4,678,695 A | 7/1987 | Tung et al. |
| 4,688,900 A | 8/1987 | Doane et al. |
| 4,695,528 A | 9/1987 | Dabisch et al. |
| 4,710,732 A | 12/1987 | Hornbeck |
| 4,713,295 A | 12/1987 | Laroche |
| 4,721,649 A | 1/1988 | Belisle et al. |
| 4,725,494 A | 2/1988 | Belisle et al. |
| 4,729,687 A | 3/1988 | Arens |
| 4,810,431 A | 3/1989 | Leidner |
| 4,837,071 A | 6/1989 | Tagoku et al. |
| 4,877,253 A | 10/1989 | Arens |
| 4,890,902 A | 1/1990 | Doane et al. |
| 4,919,521 A | 4/1990 | Tada et al. |
| 4,948,232 A | 8/1990 | Lange |
| 4,956,619 A | 9/1990 | Hornbeck |
| 4,991,941 A | 2/1991 | Kalmanash |
| 4,994,204 A | 2/1991 | Doane et al. |
| 5,039,557 A | 8/1991 | White |
| 5,075,186 A | 12/1991 | Sheridon |
| 5,128,203 A | 7/1992 | Laroche |
| 5,155,607 A | 10/1992 | Inoue et al. |
| 5,157,011 A | 10/1992 | Okabe et al. |
| 5,189,658 A | 2/1993 | Moses |
| 5,219,820 A | 6/1993 | Morohoshi et al. |
| 5,226,099 A | 7/1993 | Mignardi et al. |
| 5,249,000 A | 9/1993 | Okabe et al. |
| 5,251,048 A | 10/1993 | Doane et al. |
| 5,262,098 A | 11/1993 | Crowley et al. |
| 5,262,374 A | 11/1993 | Okabe et al. |
| 5,274,460 A | 12/1993 | Yamada et al. |
| 5,315,418 A | 5/1994 | Sprague et al. |
| 5,315,776 A | 5/1994 | Strawbridge et al. |
| 5,331,454 A | 7/1994 | Hornbeck |
| 5,344,594 A | 9/1994 | Sheridon |
| 5,354,598 A | 10/1994 | Arens |
| 5,363,222 A | 11/1994 | Ledebuhr |
| 5,383,008 A | 1/1995 | Sheridon |
| 5,384,067 A | 1/1995 | Doane et al. |
| 5,389,426 A | 2/1995 | Arens et al. |
| 5,389,945 A | 2/1995 | Sheridon |
| 5,397,503 A | 3/1995 | Yuasa et al. |
| 5,416,996 A | 5/1995 | Clemens et al. |
| 5,432,526 A | 7/1995 | Hyatt |
| 5,432,534 A | 7/1995 | Maruyama et al. |
| 5,459,602 A | 10/1995 | Sampsell |
| 5,469,020 A | 11/1995 | Herrick |
| 5,515,075 A | 5/1996 | Nakagiri et al. |
| 5,526,016 A | 6/1996 | Nakagiri et al. |
| 5,535,047 A | 7/1996 | Hornbeck |
| 5,604,027 A | 2/1997 | Sheridon |
| 5,767,826 A | 6/1998 | Sheridon et al. |
| 6,517,618 B2 * | 2/2003 | Foucher et al. ........... 106/31.16 |
| 6,524,500 B2 * | 2/2003 | Sheridon et al. ............. 264/1.7 |
| 6,549,327 B2 * | 4/2003 | Foucher et al. ............. 359/296 |

OTHER PUBLICATIONS

Wesely Wm. Wendlandt and Harry G. Hecht, *Reflectance Spectroscopy*, New York: Interscience Publishers, 1966, pp. 46–91, and 253–275.

G. Chui, "MIT researcher opens volumes of portential", San Jose Mercury News, Jun. 18, 1996, pp. 11E, 12E.

J.L. Bruneel and F. Micheron, "Optical Display Device Using Bistable Electrets", *Applied Physics Letters*, vol. 30, No. 8, Apr. 1977, pp. 382–383.

Robert L. Saxe and Robert I. Thompson, "Suspended–Particle Devices", *Information Display*, Nos. 4&5, 1996, pp. 20–23.

Lars A. Yoder, "The TI Digital Light Processing Micromirror Tech: Putting It To Work Now", *Advanced Imaging*, Jun. 1996, pp. 43–46.

"S.I.P. and ETIP to jointly develop the world's first erasable and reusable paper for printing," *Business Wire* (available through Dialog, File 610), Aug. 1991.

"Electric Paper: A Research Odyssey" *IEEE Grid*, Jan. 1996, pp. 17–20.

"Thermal Film Medium for Ricoh Permits Rewriting", *OEP (Office Equipment and Products)*, Dec. 1993, p. 61.

Peter Tebbutt, "Now you see it . . . now you don't", *New Scientist*, May 1992, p. 17.

J.D. Mosley, "Flexible LCD is lighter and thinner than glass", *EDN*, Oct. 1985, p. 93.

A. Chiang, D. Curry and M. Zarzychi, "A Stylus Writable Electrophoretic Display Device", *SID 79 Digest*, 1979 pp. 44–45.

N.K. Sheridon and M.A. Berkovitz, "The Gyricon—A Twisting Ball Display", *Proceedings of the SID*, vol. 18/3 & 4, 1977, pp. 289–293.

R. Yamaguchi and S. Sato, "Light Scattering and Reflection Properties in Polymer Dispersed Liquid Crystal Cells with Memory Effects", *IEICE Trans. Electron.*, vol. E 78 C No. 1, Jan. 1995, pp. 106–110.

G. Crawford, "A Bright New Page in Portable Displays", IEEE Spectrum, Oct. 2000, pp. 40–46.

P. Yam, "Plastics Get Wired", Scientific American, Jul. 1995, pp. 82–87.

W. Gibbs, "The Reinvention of Paper", Scientific American, Sep. 1998, pp. 36–40.

U.S. patent application Ser. No. 09/749,379, Sheridan et al., filed Dec. 28, 2000.

* cited by examiner

| Train | Status | Stop 1 | Stop 2 | Stop 3 | Stop 4 | Stop 5 | Stop 6 |
|---|---|---|---|---|---|---|---|
| 618 | on time | 07:30 | 07:37 | 07:43 | 07:50 | 07:53 | 08:10 |
| 724 | late | 07:42 | 07:49 | 07:55 | 08:03 | 08:06 | 08:23 |
| 383 | on time | 07:50 | 07:57 | 08:03 | 08:10 | 08:13 | 08:30 |
| 707 | on time | 08:00 | 08:07 | 08:13 | 08:20 | 08:23 | 08:40 |
| 454 | cancelled | | | | | | |
| 351 | on time | 08:30 | 08:37 | 08:43 | 08:50 | 08:53 | 09:10 |
| 217 | ? | | | | | | |

FIG. 19

COLORED CYBER TONER USING MULTICOLORED GYRICON SPHERES

BACKGROUND OF THE INVENTION

1. Field of Invention

The invention relates to a dynamic "cyber toner" and methods of use thereof in which microencapsulated Gyricon beads are used to create an individualized reimageable document. The document may be a multi-colored, multi-field document formed using various different colored "cyber toners."

2. Description of Related Art

Twisting ball mediums for displaying an image are well known. Such mediums include bichromal balls that rotate to show either black or white hemispheres in response to an applied electric field. Such twisting balls operate by having two or more distinct hemispheres with both an optical anisotropy and an electrical anisotropy due to each hemisphere surface having a different color and electrical charge. The twisting balls are generally embedded in a fluid-filled cavity of a transparent binder substrate to form a Gyricon sphere or bead. The substrate is then generally bonded between glass or plastic sheets to create a Gyricon display that acts as electric paper.

When an electric field is presented over the display, the twisting balls within the substrate rotate in reaction to the electric field by rotating in the fluid. U.S. Pat. No. 4,126,854 to Sheridon and U.S. Pat. No. 4,143,103 to Sheridon, each incorporated herein by reference in their entirety, describe conventional twisting ball displays.

Gyricon displays ideally have characteristics and qualities of conventional paper, such as flexibility. However, conventional Gyricon displays are not paper-like because they are generally fairly rigid. This is because it was initially believed necessary to provide glass or other substrate protective coverings or sheets to protect the Gyricon spheres. A further discussion of the disadvantages of conventional Gyricon displays is found in U.S. Pat. No. 5,064,027 to Sheridon, now U.S. Reissue Pat. No. 37,085, which is also incorporated herein by reference in its entirety.

In an effort to make the Gyricon displays more paper-like, attempts have been made to individually encapsulate the twisting particles. This is called microencapsulation. A conventional approach to microencapsulating a twisting ball centers on a chemical process where the twisting balls are first produced using conventional methods and then are subsequently immersed and treated in chemical solutions, resulting in an encapsulated capsule. One such process is disclosed in the above '027 patent. Another such process can be found in co-pending U.S. Ser. No. 09/749,379 filed Dec. 28, 2000 entitled "Method for Making Microencapsulated Gyricon Beads," the disclosure of which is incorporated herein by reference in its entirety. Other examples of microencapsulated twisting particles can be found in U.S. Pat. No. 5,961,804 to Jacobsen, U.S. Pat. No. 6,067,185 to Albert, and U.S. Pat. No. 6,120,588 to Jacobsen, the disclosures of which are each incorporated herein by reference in their entirety.

While microencapsulated displays may be an improvement over original twisting ball displays, there are still problems with such displays.

SUMMARY OF THE INVENTION

To date, efforts at making electric paper have primarily focused on forming sheets of Gyricon displays that themselves serve as rewriteable electric paper. However, such displays have limited application. For example, as the balls are usually two-sided, the resultant output of ON/OFF states results in only monochromatic detail. Moreover, operations to perform both imaging or erasure usually act on the entire sheet as the whole sheet is in the form of electric paper. There is a need for systems and methods that increase the versatility and use of Gyricon displays.

This invention provides a microencapsulated Gyricon toner or "cyber toner" that can be dynamically alterable and selectively applied to any of a number of surfaces, such as conventional paper.

This inventions separately provides methods of printing using such "cyber toners."

This invention further separately provides different colored Gyricon toners that can be selectively applied by various printing techniques to a surface to form a document that can have various fields of the document, representing text, images or graphics, be in differing colors.

This invention yet further separately provides methods and systems that enable a composite document to contain both fixed and variable data fields by combining both fixed print from conventional printing techniques and selective printing using the inventive "cyber toners" to provide a more versatile and presentable document. With such systems and methods, the document can have certain fields or areas selectively reimageable or erasable, while retaining a fixed printing (non-erasable) in other areas.

These and other features and advantages of the invention are described in, or apparent from, the following detailed description of various exemplary embodiments of the systems and methods according to the invention.

BRIEF DESCRIPTION OF THE DRAWINGS

Various exemplary embodiments of the invention will be described in detail, with reference to the following figures, wherein.

DETAILED DESCRIPTION OF PREFERRED EMBODIMENTS

The invention relates to methods and apparatus for selective printing using microencapsulated Gyricon beads on a variety of substrates. While specific examples of printing will be described, these are merely illustrative and not exhaustive.

Various exemplary embodiments of the invention will be described. In each of these, microencapsulated Gyricon beads are printed onto a suitable substrate to form a document that contains at least one area in which dynamic features including reimageable text can be formed. Such Gyricon beads are preferably monochromatic hemispheres of contrasting colors. However, multi-color dynamic printing is attainable in many such embodiments through application of different bi-colored Gyricon beads, which can be printed on certain areas of the document to create colored images and text.

Figure 1:
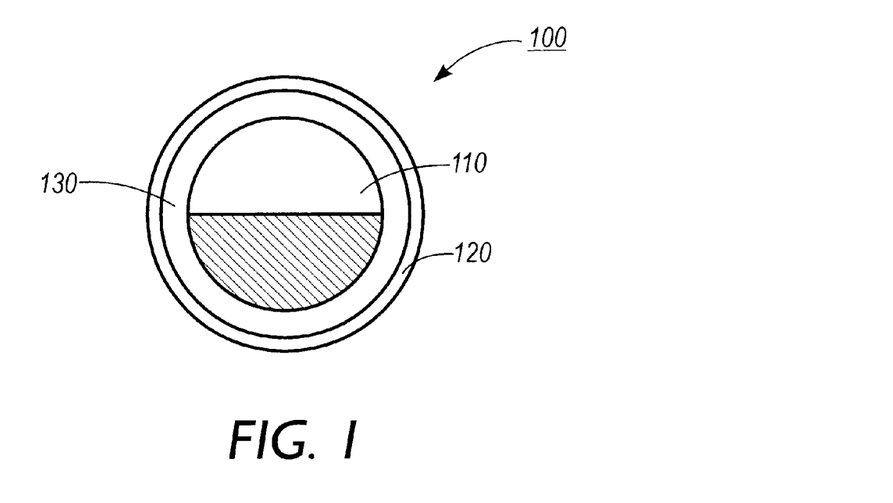
FIG. 1 is a microencapsulated Gyricon bead formed by known microencapsulation techniques.

FIG. 1 shows an exemplary microencapsulated Gyricon bead 100, which can be formed by any known or subsequently developed method, various ones of which are described in the background of the invention. Gyricon bead 100 includes a bichromal ball 110, a spherical microcapsule skin 120, and a liquid 130 provided in a space between ball 110 and skin 120. A particularly suitable method of manufacture can be found in the '027 patent to Sheridon.

Bichromal ball 110 is preferably hemispherical with two complementary and contrasting colors, such as black and white. However, other color combinations can be substituted, such as red/white, blue/white, green/white, yellow/white, and the like. The base color does not need to be white, but can be any other color that complements or contrasts with the primary color. As used in this application, Gyricon beads 100 may be of a bichromal, electric dipole or dielectric material.

The spherical skin 120 forms a capsule that surrounds and protects ball 110. Skin 120 can be made from many materials, but should be transparent, mechanically robust and electrically insulating. Suitable exemplary materials for the skin are gelatin/polyphosphate, gelatin/acacia or urea-formaldehyde. However, the invention is not limited to these.

Liquid 130 is a lubricating fluid that allows free rotation of the bichromal ball 110. Liquid 130 should also be transparent, dielectric, and have properties that do not dissolve the ball 110. Suitable exemplary fluids are Isopars or Dow silicone fluids. However, the invention is not limited to these.

As used in this application, printing is intended to include all forms of printing, both currently available and subsequently developed. This may include, for example, spray coating, meniscus coating, spin coating, roll coating, cascade coating, extrusion coating, curtain coating, forward or reverse roll coating, gravure coating, dip coating, brush coating, air knife coating, patch die coating, slot coating, silk screen printing, electrostatic printing, thermal printing, ink jet printing, xerographic printing, electrophotographic printing, and other similar printing techniques and processes.

Various exemplary substrates on which the Gyricon beads may be printed will be described. However, the invention is not limited to these and is applicable to a wide variety of other substrates, including as non-limiting examples, plain papers of various stock weights, such as Xerox 4024 paper, ruled notebook paper, or bond paper. Special papers such as silica coated papers, Jujo paper and the like may also be used. Also, Mylar sheets, glass sheets, transparencies, fabrics, textile products, various plastics, polymeric films, and inorganic substrates, such as metal or wood, may also be used.

Figure 2:
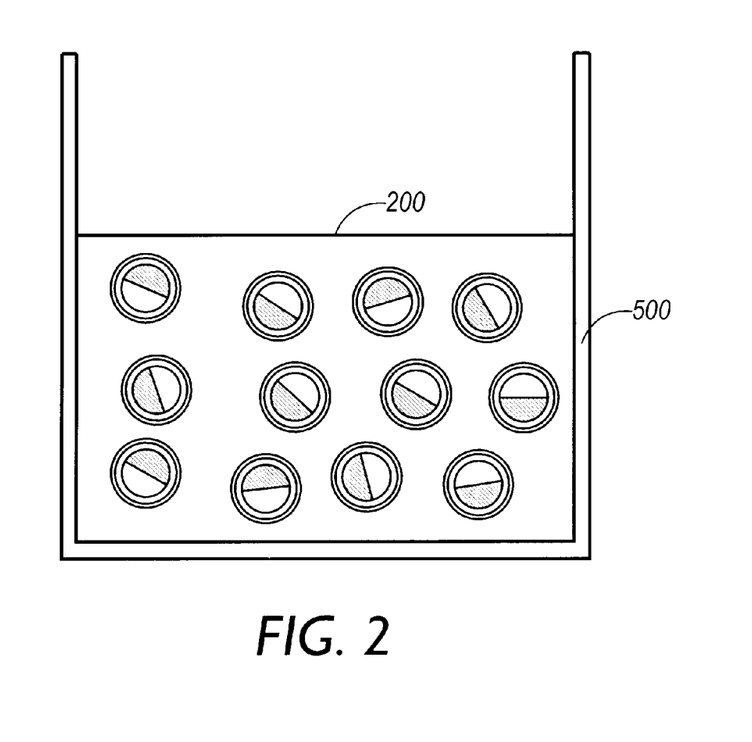
FIG. 2 shows a cyber toner formulation in which a plurality of Gyricon beads are dispersed in a toner solution.

In some exemplary embodiments, the microencapsulated Gyricon beads may be directly applied to desired areas of a substrate. However, in various other exemplary embodiments of the invention, the microencapsulated Gyricon beads 100 are first dispersed into a solution to form a liquid "cyber" toner 200 as shown in FIG. 2 that can be directly printed onto a substrate. This toner 200 upon application to the substrate may then be dynamically changed by application of electromagnetic force to alter the image. Some non-limiting examples of solution 200 are a mixture of non-aqueous and aqueous solutions, such as MeOH or EtOH in water. Solution 200 may also be a non-aqueous solution, such as acetone, iPrOH (isopropyl alcohol), MeOH, or EtOH or Isopars or Dow silicone fluids. Solids loading of the Gyricon bead slurry is in a range of 5% to 75% solids, more preferably 25–50%. A preferred solution is isopropyl alcohol with a solids content of 40%.

Gyricon beads 100 in some embodiments of the invention may also be dispersed in a solution 200 that includes a binder. Properties of the binder besides adherency should include transparency, electrically insulating and flexibility. Suitable exemplary binders may include silicone elastomer, shellac or epoxy. However, the invention is not limited to these. Many other suitable binders may be used, including water-soluble polymers, water-borne polymers, oil-soluble polymers, thermoset polymers and radiation-cured polymers. Suitable examples of these are described in U.S. Pat. No. 6,067,185 to Albert et al., and can include as non-limiting examples water bourne acrylic, urethane, polyvinylalcohol, polysaccharides, n-vinyl pyrollidone, latex resins, polyesters, etc.

Figure 3:
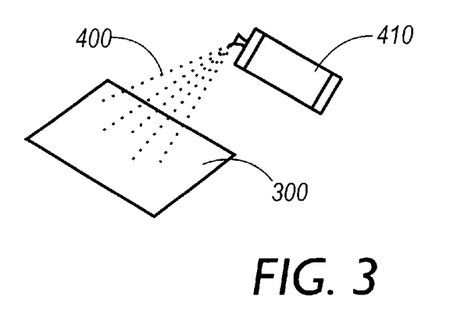
FIGS. 3–5 show a method of making an electric paper device using an adhesive coated substrate and plain microencapsulated Gyricon beads.
Figure 4:
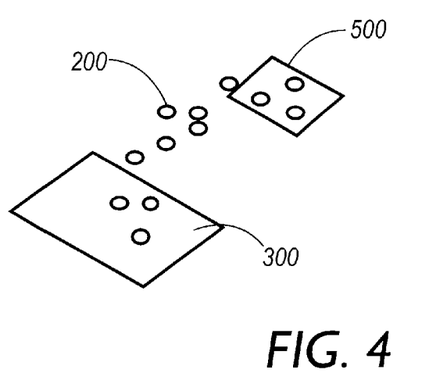
Figure 5:
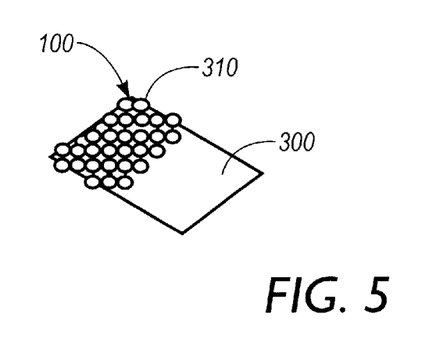

"Printing" onto a substrate to form a dynamic document containing Gyricon beads 100 can be performed in several ways, various examples of which are shown in FIGS. 3–11. These examples are meant to be illustrative and not limiting. In FIGS. 3–5, a first exemplary method of making an electric paper device by "printing" of Gyricon beads to select areas is illustrated. In this embodiment, formation of the document is through direct application of discrete microencapsulated Gyricon beads to a substrate surface.

In FIG. 3, at least one or more certain predefined areas of a suitable substrate 300 are sprayed or otherwise coated with an adhesive 400 from a source, such as a spray bottle 410. Adhesive 400 may be a glue, a silicone elastomer such as Sylgard, an epoxy, a varnish, a lacquer, or other adhesive. A particularly suitable adhesive is polyvinyl acetate, which is sprayed on the surface of substrate 300. In this example, substrate 300 is standard white paper of average stock weight. Then, in FIG. 4, four grams of encapsulated Gyricon beads are sprinkled or otherwise applied from container 500 onto the adhesive covered substrate 300. Various ones of the Gyricon beads 100 adhere to the adhesive region 400 of substrate 300 while excessive beads or beads in areas without the adhesive can be shaken off. This process may be repeated several times, preferably three times, until a monolayer of beads 100 covering the desired area(s) of substrate 300 is formed as shown in FIG. 5. This monolayer forms a dynamic reimageable area 310 on substrate 300 such that substrate 300 is now a dynamic document that can be reimaged in select areas to display or erase desired images. In this first example, adhesive 400 serves as a binder. Preferably, the binder should be transparent, electrically insulating and flexible. However, when the adhesive is between the beads and the substrate and not otherwise viewable, transparency may not be necessary.

Figure 6:
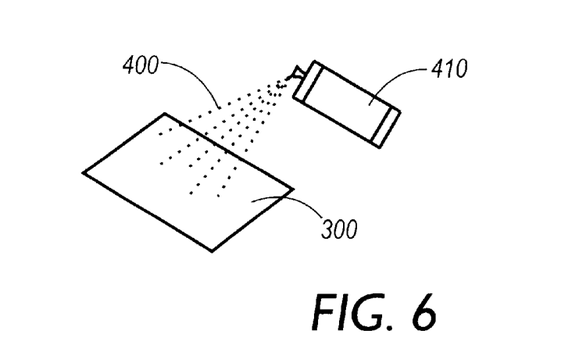
FIGS. 6–8 show an alternative method of making an electric paper device using a jet nozzle dispenser and the inventive cyber toner of FIG. 2.
Figure 7:
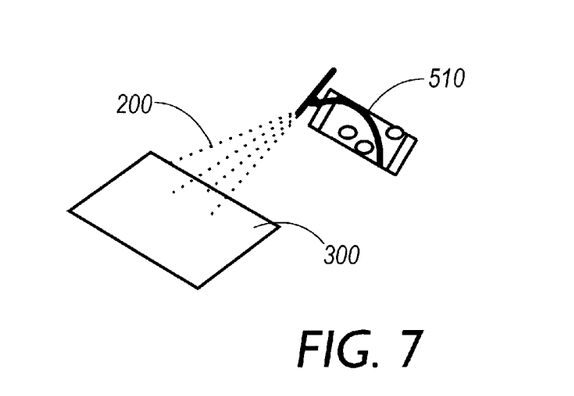
Figure 8:
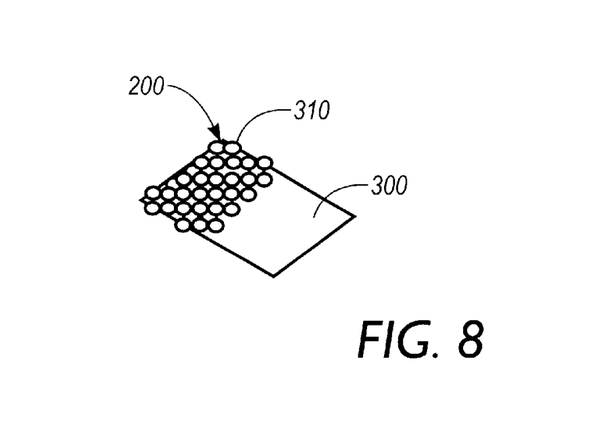

A second method of "printing" to make a dynamic document is illustrated in FIGS. 6–8. An adhesive coated substrate is provided in FIG. 6 (the same as in FIG. 4). Then, a nozzle 510 can be used to print a liquid suspension of Gyricon beads onto the substrate 300 as shown in FIG. 7 to provide the finished product of FIG. 8. Nozzle 510 can be any suitable jet nozzle capable of dispensing a slurry of beads. This could be a venturi tube, such as a TLC sprayer bottle (thin layer chromatography). It may also be an air brush or an inkjet head with oversized orifices sized to expel the slurry of beads, which are on the order of 30–100 microns. The liquid suspension in this example is preferably the "cyber toner" 200 described in FIG. 2.

Figure 9:
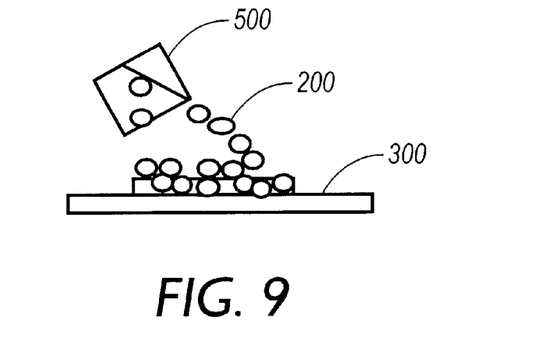
FIGS. 9–11 show an alternative method of making an electric paper device using a doctor blade.
Figure 10:
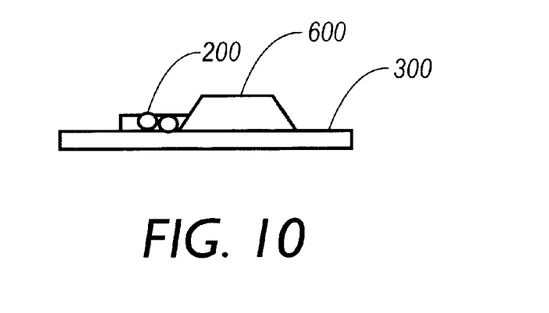
Figure 11:
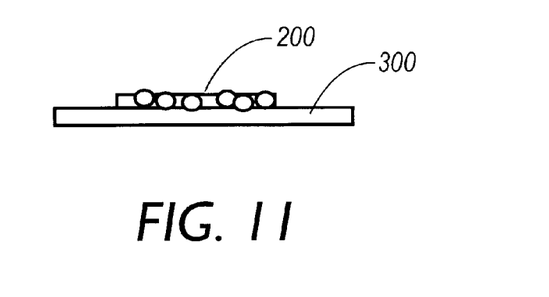

A third method of "printing" to make a dynamic document is illustrated in FIGS. 9–10. In FIG. 9, microencapsulated beads 100 are suspended in a binder, such as silicone elastomer, to form another form of cyber toner 200 and poured, dispensed, sprayed or otherwise printed onto a desired substrate. As the binder allows more than a monolayer to adhere to one another, it may be necessary to provide a smooth, consistent monolayer. This may be performed, for example by a blade, such as a knife-edged doctor blade 600, to provide a smooth surface, preferably resulting in a monolayer of beads spread evenly over the surface of the substrate. The silicone binder allows the Gyricon beads 100 to adhere to the substrate.

Alternatively, microencapsulated Gyricon beads may be suspended in an elastomer and placed between two Mylar sheets. Then, a rod may be rolled across the top Mylar sheet to evenly spread the suspension. Spacers may be used to control the thickness of the sandwiched film to provide a desired monolayer of suspended Gyricon beads.

The thus formed documents with dynamic print area(s) 310 can then be prepared for use by dynamic field addressing in which the print area is sandwiched between two conductive surfaces and a voltage of about −300V is applied to convert the image to a black state (unshown). A suitable image may then be formed by conventional techniques. For example, one suitable method of forming an image on the document is as follows. A top electrode is removed and a cutout of a template in the form of a desired image on conductive plastic is placed over the substrate. A voltage of about +300V is then applied to the template to create an image in a white state. However, any conventional or subsequently developed method of forming or erasing the dynamic print areas can be used. For example, imaging may be by static field addressing where the document is placed on a ground plane and a static gun is used to eject a stream of positively or negatively charged particles towards the Gyricon beads to selectively change their bichromal state. Circuit board addressing may also be used.

Figure 12:
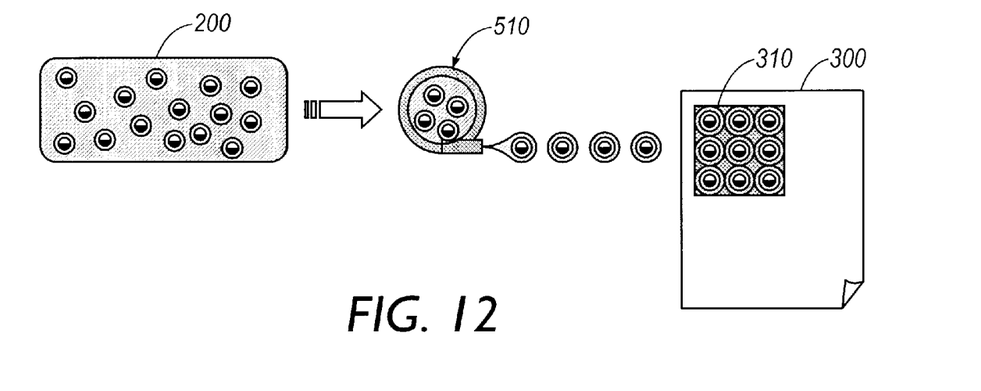
FIG. 12 shows an exemplary process for forming a customized dynamic document from an ordinary sheet stock or other substrate that includes at least one discrete dynamic reimageable data field according to the invention.
Figure 13:
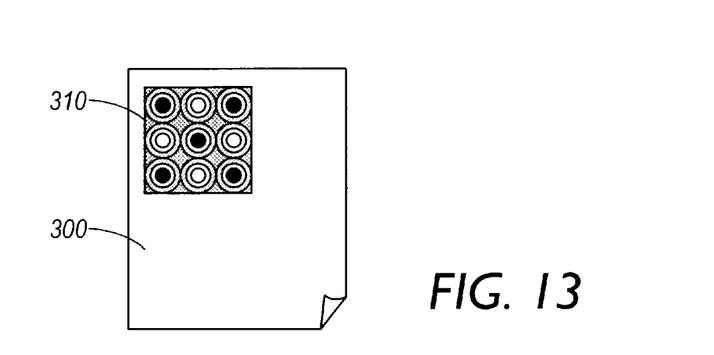
FIGS. 13–14 are examples showing the document of FIG. 12 being selectively reimaged to a different pattern.
Figure 14:
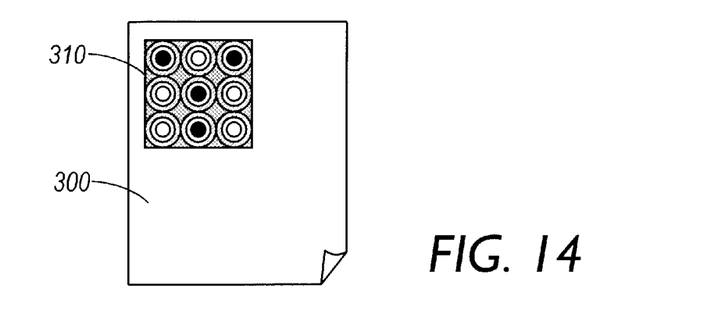

An example of printing and using a dynamic document with Gyricon beads will be described with reference to FIGS. 12–14. In FIG. 12, an ordinary substrate, such as paper is printed with a cyber toner 200 containing a plurality of Gyricon beads from a nozzle 510 so as to define a dynamic reimageable area 310 on the substrate. Initially, the Gyricon beads 100 are randomly or uniformly oriented as shown in FIG. 12. However, by subjecting the area 310 selectively or uniformly to an electromagnetic field, a first image may be formed as shown in FIG. 13. This image is dynamic in that upon being subjected to a different electromagnetic force, the area 310 is able to be erased or modified to another image as shown in FIG. 14.

While dynamic reimageable areas 310 are shown illustratively in FIGS. 3–14 as being rectangular areas that can be selectively addressed to form a desired image, graphic or text, the invention is not limited to this. Rather, in some embodiments, text or graphics are formed as a result of the "printing" or application of Gyricon beads onto the substrate, as shown in FIGS. 15–18. These areas thus may not necessarily be modified to provide different images, but can be addressed to change their appearance, such as to dynamically alter the image to change color, blink, turn on and off, etc. For example, when the substrate is white and the bichromal beads are monochromatic white/black, reversal results in effectively turning the area 310 off by making it the same color as the background. Color change can be attained by use of bichromal balls of contrasting colors, such as red/green. Polarity change thus can change the image from red to green.

Figure 15:
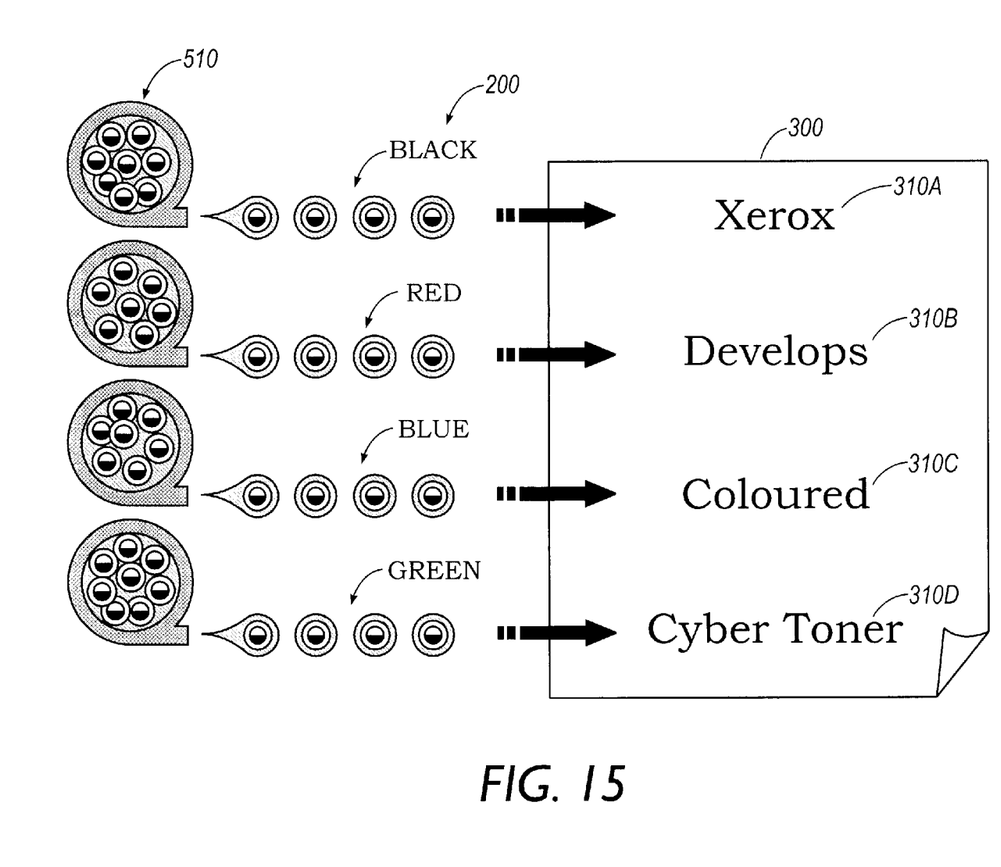
FIG. 15 shows an exemplary process for forming a multi-colored dynamic document in which various fields are formed by different cyber toner colors to achieve a multi-color reimageable document.

Color printing is also achievable with the claimed invention as illustrated in FIGS. 15–18. In FIG. 15, substrate 300 is printed on using various nozzles 510, each with different colored cyber toners 200 so as to provide dynamic reimageable areas 310A, 310B, 310C and 310D that may be of differing color. For example, area 310A may be formed by black/white bichromal Gyricon beads. Area 310B may be formed from red/white bichromal Gyricon beads. Area 310C may be formed from blue/white bichromal beads. Area 310D may be formed from green/white bichromal Gyricon beads. As discussed, while these reimageable areas 310A–D may be rectangular or other shaped areas that can be selectively addressed to form images, these areas 310A–D may also be shaped or imaged into desired text or graphics during printing using nozzle 510.

Figure 16:
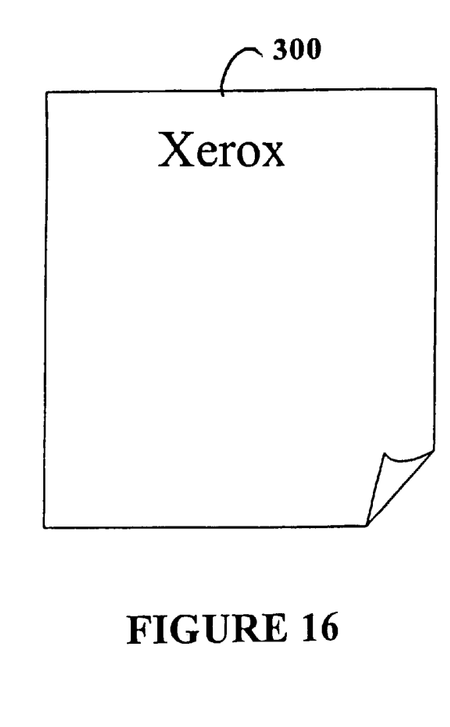
FIGS. 16–18 show various dynamic reconfigurations of the document of FIG. 15 in which selective fields have been dynamically reimaged to expose or erase various fields of information.
Figure 17:
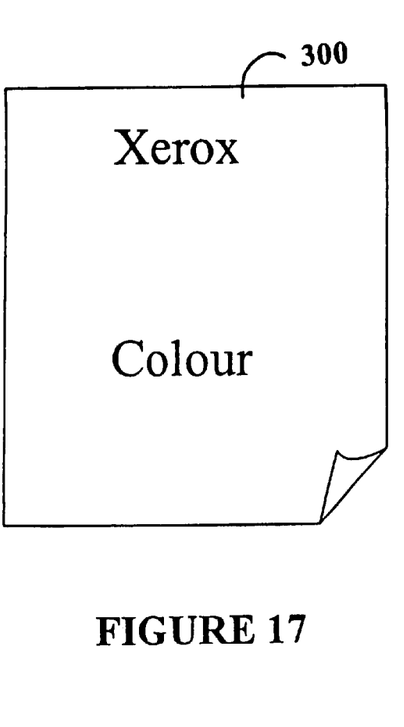
Figure 18:
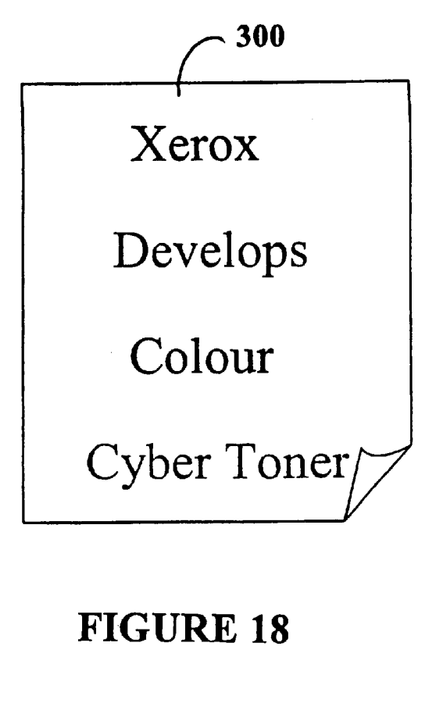

These different areas 310 may each be selectively addressed to either retain, erase or modify the images thereon as shown in FIGS. 16–18. For example, in FIG. 16, only the black area 310A remains and areas 310B, 310C and 310D are shown erased. In FIG. 17, the black area 310A and the blue area 310C are shown, and in FIG. 18, all areas 310A–D are again addressed and shown. As previously discussed, this dynamic change in appearance is through manipulation of an electromagnetic force to the Gyricon beads.

Figure 19:
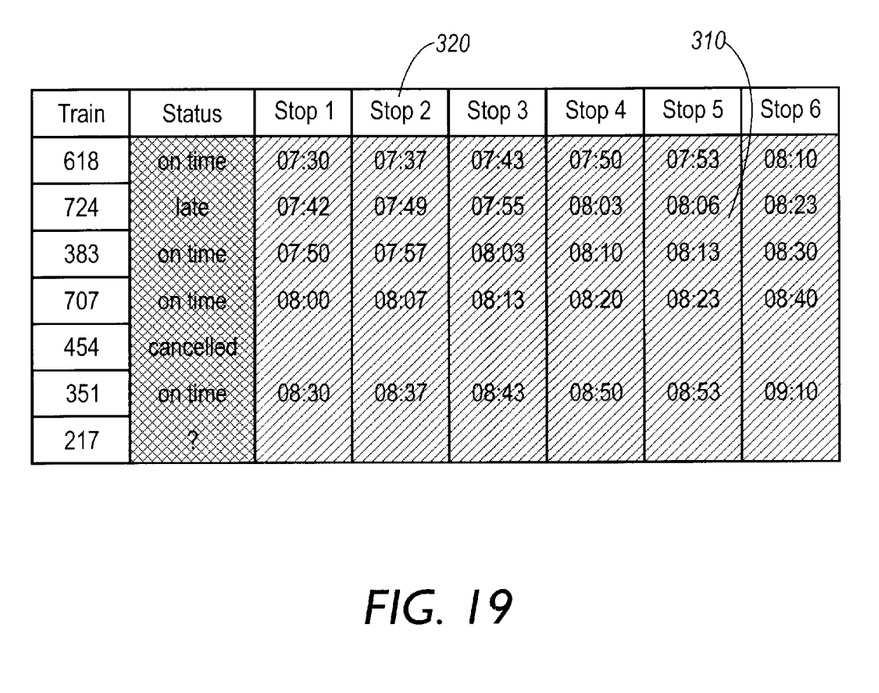
FIG. 19 is another exemplary reimageable document showing a specific example of a partially dynamic document having various fixed fields and associated variable reimageable fields.

Each of the above methods of "printing" and imaging achieve a dynamic document containing one or more reimageable printing areas 310. There are many applications for such a versatile document in which only select regions are dynamically reimageable. For example, as shown in FIG. 19, a document may be formed using a conventional substrate such as paper that is selectively marked with both conventional printing, such as by ink jet or laser printer, and dynamic printing using the inventive Gyricon beads. This may be, for example, a document with stock price quotes in reimageable text printed next to the name of the stock in normal non-dynamic text. It could also be a document with sports scores printed in dynamic "cyber toner" with the team names in regular text. The document could also be, for example, a bus or train schedule in which routes are printed normally and arrival times are printed with colored dynamic reimageable text or graphics as shown. That is, areas in cross-hatching represent reimageable areas 310 that can be dynamically changed while areas 320 are fixed areas that receive normal text, such as from an ink jet printer. These are but a few examples of how a customizable dynamic document can be formed that provides reimageable color presentation.

With the invention, documents can be attained that are more vibrant and highlight or give emphasis to important information, while also adapting to change by making variable data areas that can be reimaged to change the appearance of the document.

What is claimed is:

1. A dynamically reimageable document, comprising:
   a substrate having a surface;
   one or more discrete regions on the surface of the substrate containing a plurality of microencapsulated Gyricon beads that define at least two dynamic reimageable image regions, each with a particular pattern and the Gyricon beads of one of the two dynamic regions differ in color from the Gyricon beads of the other dynamic region; and
   one or more fixed image regions containing fixed printing,
   wherein at least one of the at least two dynamic reimageable image regions is of a different color than one of the fixed image regions to form a multi-colored document.

2. The dynamically reimageable document of claim 1, wherein the Gyricon beads are dispersed in a liquid solution and form a toner that is printed on the dynamic reimageable image regions.

3. The dynamically reimageable document of claim 2, wherein the solution includes a binder.

4. The dynamic reimageable document of claim 2, wherein the solution is an aqueous solution.

5. The dynamic reimageable document of claim 4, wherein the solution is a mixture of non-aqueous and aqueous solutions, with the non-aqueous solution being selected from the group of MeOH and EtOH.

6. The dynamic reimageable document of claim 2, wherein the solution is a non-aqueous solution.

7. The dynamic reimageable document of claim 6, wherein the non-aqueous solution is selected from the group of acetone, iPrOH, MeOH, EtOH, Isopars, and Dow silicone fluids.

8. The dynamic reimageable document of claim 1, wherein at least one of the dynamic reimageable image regions is patterned in the shape of an object selected from the group of text and graphics.

9. The dynamic reimageable document of claim 8, wherein the object can be reimaged by erasure of the object by reversal of a charge on the Gyricon beads forming the object.

10. The dynamic reimageable document of claim 1, wherein the substrate is paper.

11. The dynamic reimageable document of claim 1, wherein the substrate is a transparency.

12. The dynamic reimageable document of claim 1, wherein the substrate is fabric.

13. A dynamically reimageable document, comprising:
    a conventional a paper having a surface; and
    at least two discrete regions on the surface of the conventional paper containing a plurality of microencapsulated Gyricon beads that define one or more dynamic reimageable image regions each with a particular pattern,
    wherein the Gyricon beads are bichromal with contrasting colors and a first of the two discrete regions contains Gyricon beads of a color different than Gyricon beads in a second of the two discrete regions so as to provide a multi-colored document.

14. The dynamically reimageable document of claim 13, wherein at least some of the Gyricon beads have black/white hemispheres.

15. The dynamically reimageable document of claim 13, wherein the Gyricon beads are dispersed in a liquid solution and form a toner that is printed on the dynamic reimageable image regions.

16. The dynamic reimageable document of claim 15, wherein the solution includes a binder.

17. The dynamic reimageable document of claim 16, wherein the binder is selected from the group of silicone elastomer, shellac and epoxy.

18. The dynamic reimageable document of claim 15, wherein the solution is an aqueous solution.

19. The dynamic reimageable document of claim 18, wherein the solution is a mixture of non-aqueous and aqueous solutions, with the non-aqueous solution being selected from the group of MeOH and EtOH.

20. The dynamic reimageable document of claim 15, wherein the solution is a non-aqueous solution.

21. The dynamic reimageable document of claim 20, wherein the non-aqueous solution is selected from the group of acetone, iPrOH, MeOH or EtOH.

22. The dynamic reimageable document of claim 13, wherein at least one of the dynamic reimageable image regions is patterned in the shape of an object selected from the group of text and graphics.

23. The dynamic reimageable document of claim 22, wherein the object can be reimaged by erasure of the object by reversal of a charge on the Gyricon beads forming the object.

24. The dynamic reimageable document of claim 13, further comprising one or more fixed image regions containing fixed printing.

25. The dynamic reimageable document of claim 24, wherein the one or more fixed image regions contains fixed data fields and at least one of the dynamic reimageable image regions contains variable data fields.

26. The dynamic reimageable document of claim 1, wherein the one or more fixed image regions contains fixed data fields and at least one of the dynamic reimageable image regions contains variable data fields.

* * * * *